(12) United States Patent
Gwag et al.

(10) Patent No.: US 10,337,546 B2
(45) Date of Patent: Jul. 2, 2019

(54) INSERT ASSEMBLY FOR FINISHING GAP REGION

(71) Applicant: LG ELECTRONICS INC., Seoul (KR)

(72) Inventors: Hyoseong Gwag, Seoul (KR); Minchul Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 153 days.

(21) Appl. No.: 15/311,775

(22) PCT Filed: Jun. 23, 2016

(86) PCT No.: PCT/KR2016/006680
§ 371 (c)(1),
(2) Date: Nov. 16, 2016

(87) PCT Pub. No.: WO2017/007150
PCT Pub. Date: Jan. 12, 2017

(65) Prior Publication Data
US 2017/0175786 A1 Jun. 22, 2017

(30) Foreign Application Priority Data
Jul. 7, 2015 (KR) ........................ 10-2015-0096741

(51) Int. Cl.
| | |
|---|---|
| F16B 5/06 | (2006.01) |
| A47B 47/00 | (2006.01) |
| A47B 95/00 | (2006.01) |
| F24C 15/08 | (2006.01) |
| F24C 15/30 | (2006.01) |
| A47L 15/42 | (2006.01) |
| D06F 39/12 | (2006.01) |

(52) U.S. Cl.
CPC ........ *F16B 5/0614* (2013.01); *A47B 47/0033* (2013.01); *A47B 95/002* (2013.01);
(Continued)

(58) Field of Classification Search
CPC .......... A47B 47/0033; A47B 2095/725; A47B 2220/0063; A47B 2230/01;
(Continued)

(56) References Cited

U.S. PATENT DOCUMENTS 3,646,716 A * 3/1972 Jenner ....................... E04B 1/68
52/396.04
3,940,893 A * 3/1976 Rausch ................. E04B 1/6812
52/91.3
(Continued)

FOREIGN PATENT DOCUMENTS

| CH | 436611 A | * 5/1967 | ......... A47B 47/0008 |
|---|---|---|---|
| CN | 204334785 U | 5/2015 | |

(Continued)

*Primary Examiner* — Josh Skroupa
(74) *Attorney, Agent, or Firm* — Dentons US LLP

(57) ABSTRACT

An insert assembly inserted in a gap region provided in a panel to fill the gap region, the insert assembly including a body unit covering the gap region not to be exposed to the outside, an insert unit extended from the body unit and inserted in the gap region, and a hook unit extended a preset distance from the insert unit toward the body unit, the hook unit comprising one end connected to the insert unit and the other end provided as a free end, wherein the body unit, the insert unit and the hook unit are integrally formed with each other as one body.

12 Claims, 10 Drawing Sheets

(52) U.S. Cl.
CPC .............. *F24C 15/08* (2013.01); *F24C 15/30* (2013.01); *A47B 2230/01* (2013.01); *A47L 15/427* (2013.01); *D06F 39/12* (2013.01); *Y10T 403/1608* (2015.01)

(58) Field of Classification Search
CPC ......... A47B 2095/046; E04B 2002/725; F16B 5/0614; F16B 5/12; F16B 5/121; F16B 5/126; F16B 12/26; F16B 12/38; F16B 13/04; F16B 13/0833; Y10T 24/45099; Y10T 24/45105; Y10T 403/15–403/17; Y10T 403/1608
USPC .................. 403/10–12, 23; 24/581.1, 581.11
See application file for complete search history.

(56) References Cited

U.S. PATENT DOCUMENTS

| | | | |
|---|---|---|---|
| 4,736,563 A * | 4/1988 | Bilhorn | A01G 9/14 52/460 |
| 4,966,424 A * | 10/1990 | Schneider | A47B 67/02 312/263 |
| 5,039,177 A * | 8/1991 | Newell et al. | E04B 1/68 52/396.04 |
| 6,843,025 B2 * | 1/2005 | Paz | E04B 1/34315 312/111 |
| 9,121,426 B2 * | 9/2015 | Jagoda | F16B 5/0657 |
| 9,874,010 B2 * | 1/2018 | Gosling | E04B 2/721 |
| 2013/0199001 A1 | 8/2013 | Jagoda | |

FOREIGN PATENT DOCUMENTS

| | | | | |
|---|---|---|---|---|
| CN | 204403765 U | | 6/2015 | |
| EP | 1236836 A2 | * | 9/2002 | ............ F16B 5/0614 |
| EP | 1580442 A2 | * | 9/2005 | ............ F16B 5/0614 |
| GB | 556249 A | * | 9/1943 | ............ A47B 95/04 |
| JP | 10-246445 A | | 9/1998 | |
| JP | 2002283929 A | | 10/2002 | |
| KR | 20-0140519 Y1 | | 5/1999 | |
| KR | 20-1999-0019703 | | 6/1999 | |
| KR | 20-0161425 Y1 | | 11/1999 | |
| KR | 20-2014-0000994 U | | 2/2014 | |

\* cited by examiner

INSERT ASSEMBLY FOR FINISHING GAP REGION

This application is a National Stage Application of International Application No. PCT/KR2016/006680, filed on Jun. 23, 2016, which claims the benefit of Korean Patent Application No. 10-2015-0096741, filed on Jul. 7, 2015, all of which are hereby incorporated by reference in their entirety for all purposes as if fully set forth herein.

FIELD

Embodiments of the present disclosure relate to an insert assembly for finishing a gap region so as to enhance an exterior appearance and stability of an electric home appliance having the gap region such as a hole or a slit.

BACKGROUND

Referring to FIG. 1, a panel 100 used in an electric home appliance is fabricated by bending one side and the other side of a steel sheet.

The one side and the other side are arranged adjacent to each other in the bending process and then a corner 100 is formed.

In this instance, it is impossible to couple the two sides completely in the bending process and a slit or a hole (hereinafter, a gap region) is usually formed.

The gap region 110 happens to expose a sharp surface of the steel sheet and deteriorates safety. Also, the gap region 110 generates tolerance or more errors and it is then difficult to assemble components.

Accordingly, a welding process is additionally performed to finish the gap region 110 in the prior art to which the present disclosure pertains to. However, such a welding process is likely to raise production cost and the welded portion has to be polished additionally.

Recently, an insert assembly developed including a wedge 200 and a supporter 300 which are assembled to each other as shown in FIG. 5 and the insert assembly is inserted in the gap region 110.

However, such an insert assembly has to use many components and requires auxiliary assembly lines. The conventional insert assembly has disadvantages of much production time and high production cost.

DETAILED DESCRIPTION OF THE INVENTION

Technical Problem

To overcome the disadvantages, an object of the present disclosure is to provide an insert assembly integrally configured to facilitate a finishing process of a gap region of a panel.

A further object of the present disclosure is to provide an insert assembly which never separates after being inserted in the gap region.

A still further object of the present disclosure is to provide an insert assembly supported by a panel regardless of the shape of gap region not to separate from the gap region.

A still further object of the present disclosure is to provide an insert assembly which is able to be inserted in the gap region smoothly.

A still further object of the present disclosure is to provide an insert assembly of which an assembly process is simple and which needs no additional assembly process.

A further object of the present disclosure is to provide a system interworking between a cooking apparatus and a kitchen device which may prevent the safety problems generated in using the cooking apparatus.

Technical Solution

To achieve these objects and other advantages and in accordance with the purpose of the embodiments, as embodied and broadly described herein, an insert assembly inserted in a gap region provided in a panel to fill the gap region, the insert assembly comprises a body unit covering the gap region not to be exposed to the outside; an insert unit extended from the body unit and inserted in the gap region; and a hook unit extended a preset distance from the insert unit toward the body unit, the hook unit comprising one end connected to the insert unit and the other end provided as a free end, wherein the body unit, the insert unit and the hook unit are integrally formed with each other as one body.

The hook unit may be formed of a material having elasticity.

The hook unit may be able to rotate on the insert unit within a range of preset angles. The insert unit may comprise a hook unit accommodating hole which is able to accommodate the hook unit while the insert unit is inserted in the gap region.

The insert unit may comprise an extension rib extended from each end of the body unit; and an insert rib extended from one end of the extension rib and in parallel with the body unit.

The insert rib may be shorter than the body unit.

A cross section of the insert rib may be wedge-shaped.

The hook unit may comprise one or more holes provided therein.

The hook unit may comprise a connection rib projected from the insert unit toward the body unit; and a support rib provided in one end of the connection rib and able to contact with an internal wall of the panel.

A plurality of connection ribs may be spaced apart a preset distance from each other and the support rib is connected to all of the connection ribs.

The insert assembly may further comprise a restriction unit projected from the body unit toward the hook unit accommodating hole and restricting the rotation of the support rib by contacting with one surface of the support rib.

The restriction unit may be projected in the direction which is equal to the direction in which the hook unit is spaced apart from the insert unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Advantageous Effects

The embodiments have following advantageous effects. According to the embodiments of the present disclosure, all components of the insert assembly in accordance with the present disclosure may be integrally formed with each other.

Only when the insert assembly integrally formed as one body is inserted in the gap region, the insert assembly may be fixed by the hook unit 430 and the gap region 110 of the panel 100 may be finished simply.

Still further, the body unit, the insert unit and the hook unit may be manufactured through one manufacture process and the assembly process may get simple. In addition, the assembly process of insert assembly 400 may be omitted. As a result, the overall production time and cost may be lowered.

The insert assembly may be inserted in the gap region of the panel and seal and finish the gap region. Accordingly, a sharp surface of the gap region will not be exposed outside and safety can be enhanced.

The gap region is not exposed outside by the insert assembly. Accordingly, the external design may be enhanced.

The insert assembly may prevent moisture or foreign substances from coming through the gap region. Accordingly, the insert assembly 400 may prevent the panel from getting corroded or home electric appliances including such the panel from getting damaged.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Referring to the accompanying drawings, a system interworking between a cooking apparatus and a kitchen device in according to one embodiment of the present disclosure will be described in detail. Regardless of numeral references, the same or equivalent components may be provided with the same reference numbers and description thereof will not be repeated. For the sake of brief description with reference to the drawings, the sizes and profiles of the elements illustrated in the accompanying drawings may be exaggerated or reduced and it should be understood that the embodiments presented herein are not limited by the accompanying drawings.

Figure 1:
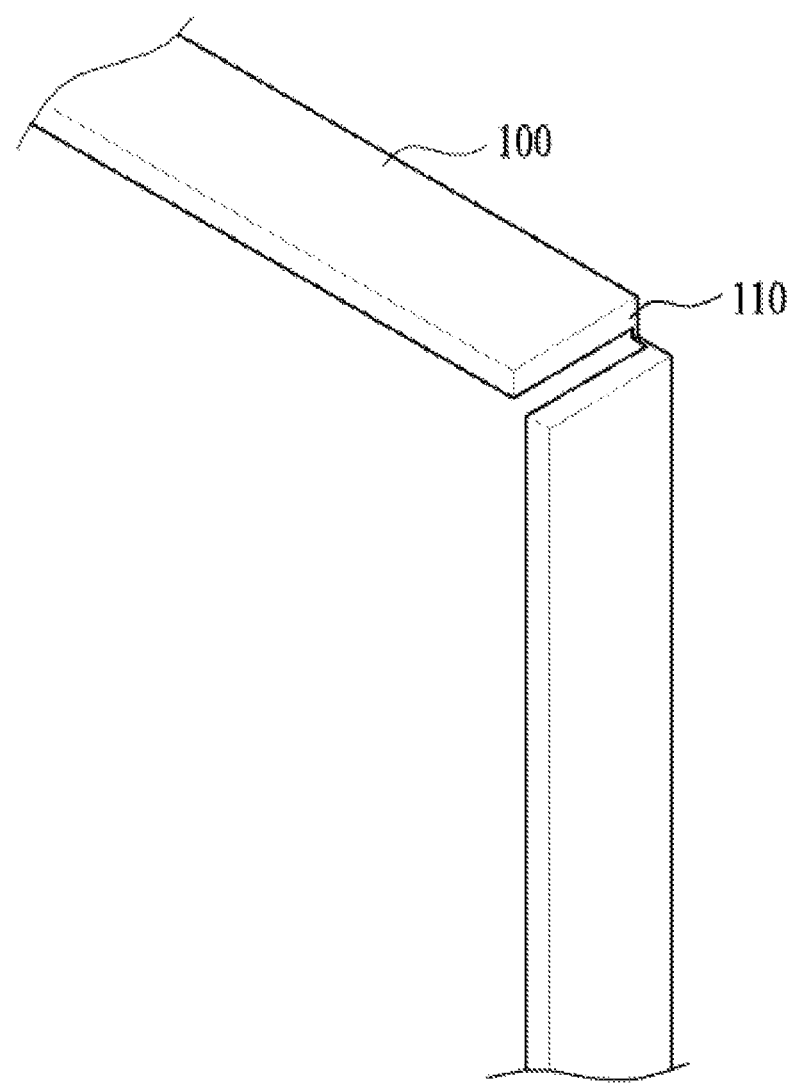
FIG. 1 is a block diagram illustrating a gap region of a corner portion provided in a panel or a cabinet.
Figure 2:
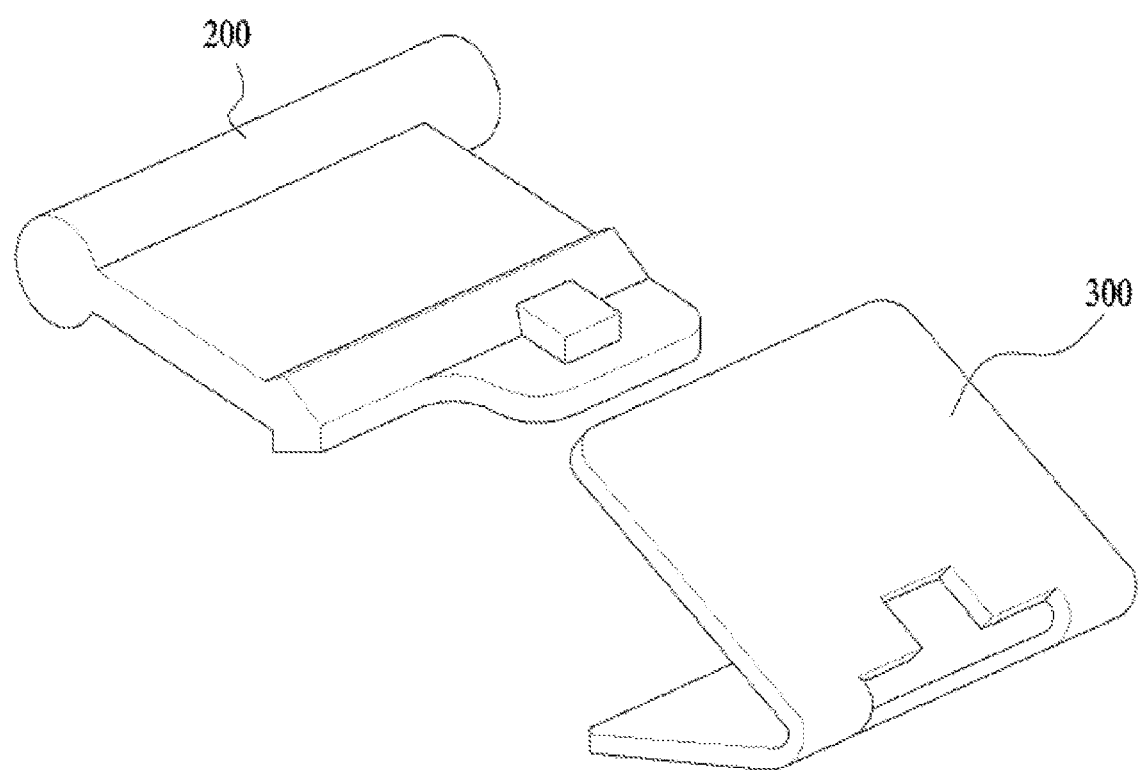
FIG. 2 is a diagram illustrating a conventional insert assembly.
Figure 3:
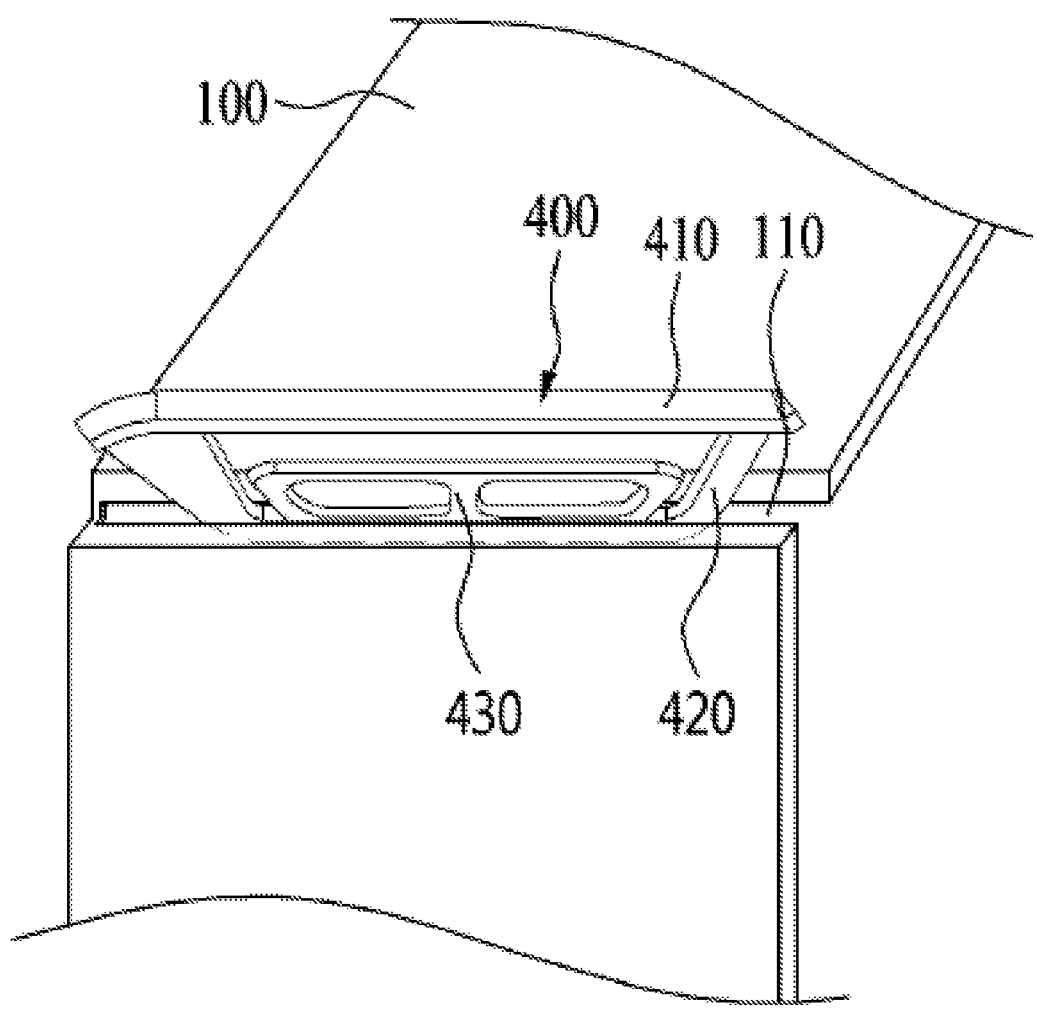
FIG. 3 is a diagram illustrating a method of inserting an insert assembly in accordance with the present disclosure in the gap region.

FIG. 3 is a diagram illustrating a process of inserting an insert assembly 400 in accordance with the present disclosure in a gap region 110 of a panel 100 to finish the insert assembly 400.

The insert assembly 400 includes a body unit 410 not exposing a hole or a slit (hereinafter, a gap region) of cabinet 100 (hereinafter, a panel) outside, an insert unit extended from the body unit 410 to be inserted in the gap region 420 and a hook unit 430 extended from the insert unit 420 to the body unit 410, with one free end.

When the insert assembly 400 is inserted in the gap region 110, the body unit 410 seals the gap region 110, not looks inserted in the gap region 110.

The hook unit 430 of the insert unit 420 is inserted in the gap region 110 and arranged within the panel 100.

Accordingly, the body unit 410 may not expose the gap region 110 of the panel 100 outside and also partially form an exterior appearance of the panel 100.

The body unit 410 partially forms the exterior appearance of the panel 100 and it is preferred that the body unit 410 is forcibly provided as a key part.

It is also preferred that the insert unit 420 is forcibly provided as key part. In this instance, the insert unit 420 may be inserted in the gap region 110 of the panel, in a circular shape.

Figure 4:
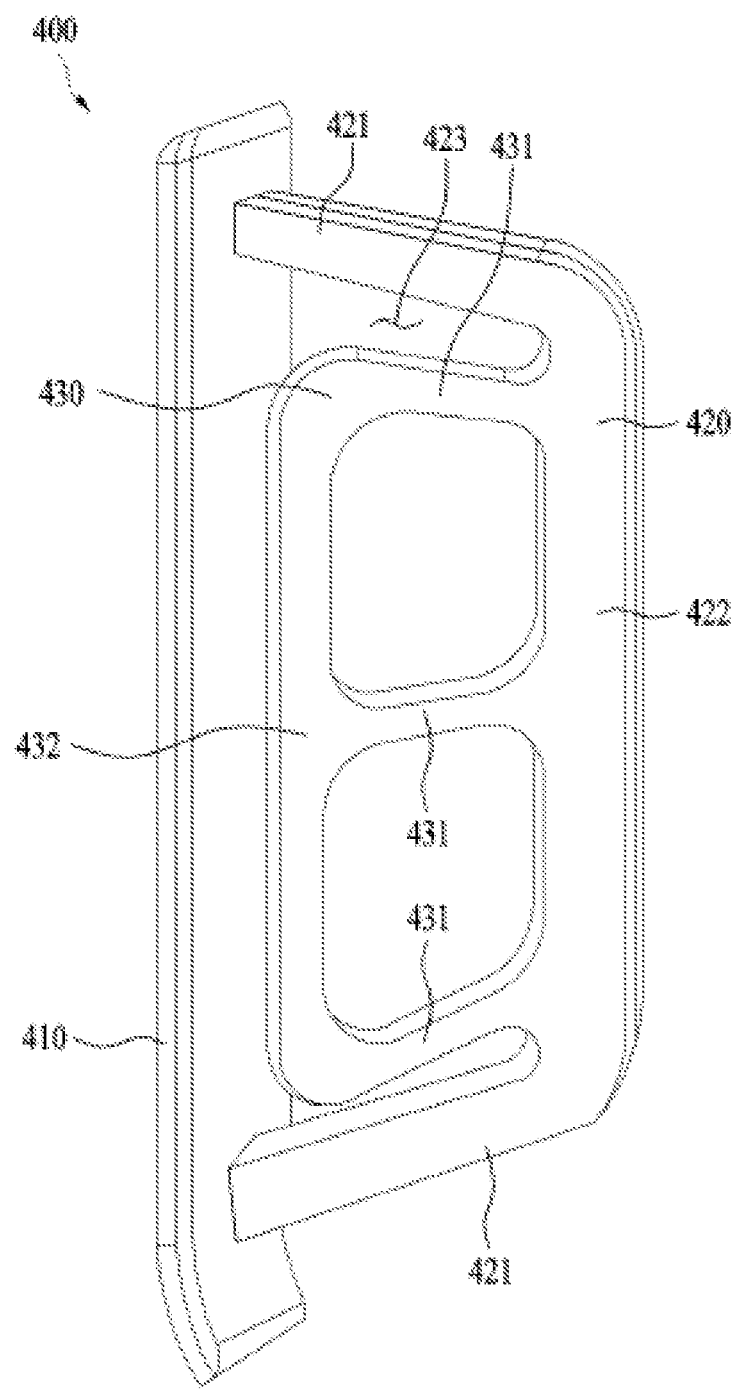
FIG. 4 is a diagram illustrating a structure of the insert assembly in accordance with the present disclosure.

FIG. 4 is a diagram illustrating the structure of the insert assembly 400 in accordance with the present disclosure.

Referring to FIG. 4, the insert assembly 400 includes the body unit 410 filling in the gap region 110 to define an exterior appearance of the panel 100.

The body unit 410 has a predetermined shape corresponding to the gap region 110.

Specifically, only unless exposing the gap region 110 outside, the body unit 410 may have any one of various shapes.

For example, if the gap region 110 is a slit, the body unit 110 has a bar shape. If the gap region 110 has a circular shape, the body unit 410 may also have a circular shape.

As one example of the body unit 410 shown in FIG. 4, the body unit 410 is shown in a bar shape and the examples of the present disclosure are not limited thereto.

The insert unit 420 may be provided from one surface of the body unit 410. The insert unit 420 may be inserted in the panel 100 to fix the body unit 410 to the gap region 100.

As shown in FIG. 4, the insert unit 420 may include an extension rib 421 extended from both ends of the body unit 410 at a preset angle with respect to the body unit 410 and an insert rib 422 extended from one end of the extension rib 421 in parallel with the body unit 410.

In this instance, the insert rib 422 may be shorter than the body unit 410 so that the insert unit 420 may be inserted in the gap region 110 easily even unless located in the preset position in the gap region 110.

The cross section area of the insert rib 422 may be wedge-shaped and the insert unit 420 having the wedge-shaped inset rib 422 may be inserted in the gap region 110 smoothly.

The extension rib 421 and the insert rib 422 may form a hook accommodating hole 423 accommodating the hook unit 430.

If the body unit 410 is formed in the circular shape to seal the hall-shaped gap region 110, the insert unit 420 may be formed in a needle or auger shape as not shown in the drawings.

Even in this instance, the hook unit accommodating hole 423 may be provided in the needle or auger shaped insert unit 420.

As another example, the insert unit 420 may be formed in a plate shape extended from one surface of the body unit 410. Even in this instance, the insert unit 420 may include a hook unit accommodating hole 423 penetrating therein to accommodating the hook unit 430.

In other words, the insert unit 420 may have one of various shapes only if it can be inserted in the gap region 110.

The hook unit 430 may be extended from the insert unit 420 toward the body unit 410. One end of the hook unit 430 may be connected to the insert unit 420 and the other end is a free end toward the body unit 410.

The hook unit 430 may be made of a steel or rubber sheet with some elasticity to rotate, so that it may rotate on the insert unit 420 within a range of preset angles.

Specifically, the hook unit 430 may rotate or bend with respect to one end connected to the insert unit 420.

FIG. 4 illustrates a first embodiment of the hook unit 30 provided in parallel with the insert unit 420.

As shown in FIG. 4, the hook unit 430 may be arranged in parallel with the insert unit 430, in other words, attached to the insert unit 420 in parallel.

When the hook unit accommodating hole 423 is provided in the insert unit 420, the hook unit 430 is insertedly accommodated by the hook unit accommodating hole 423 to be arranged in parallel with the inserted unit 420.

Figure 5:
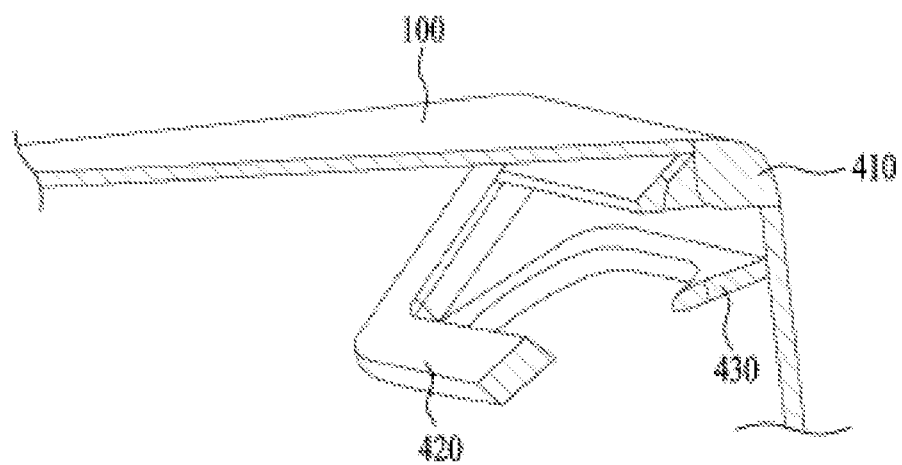
FIG. 5 is a diagram illustrating a method of settling the insert assembly in the gap region of the panel.

FIG. 5 illustrates the insert assembly 400 coupled to the panel 100, when the hook unit 430 is arranged in parallel with the insert unit 420.

While the insert unit 400 is inserted in the gap region 110, the insert unit 420 is inserted in the gap region 110. At this time, the hook unit 430 is also inserted in the gap region 110 and parallel with the insert unit 420.

Once the inserting of the insert unit is complete, the hook unit 430 having certain elasticity may be dropped by its own weight.

Hence, the hook unit 430 contacts with an internal wall of the panel 110 to support the insert assembly 400. Accordingly, the inset assembly 400 may be supported securely without separating from the panel 100.

Although not shown in the drawings, the hook unit 430 may be made of a rigid member and coupled with the insert unit 420 by a hinge. In this instance, the hook unit 430 may is rotated on the insert unit by its own weight and contact with the internal wall of the panel 100.

Figure 6:
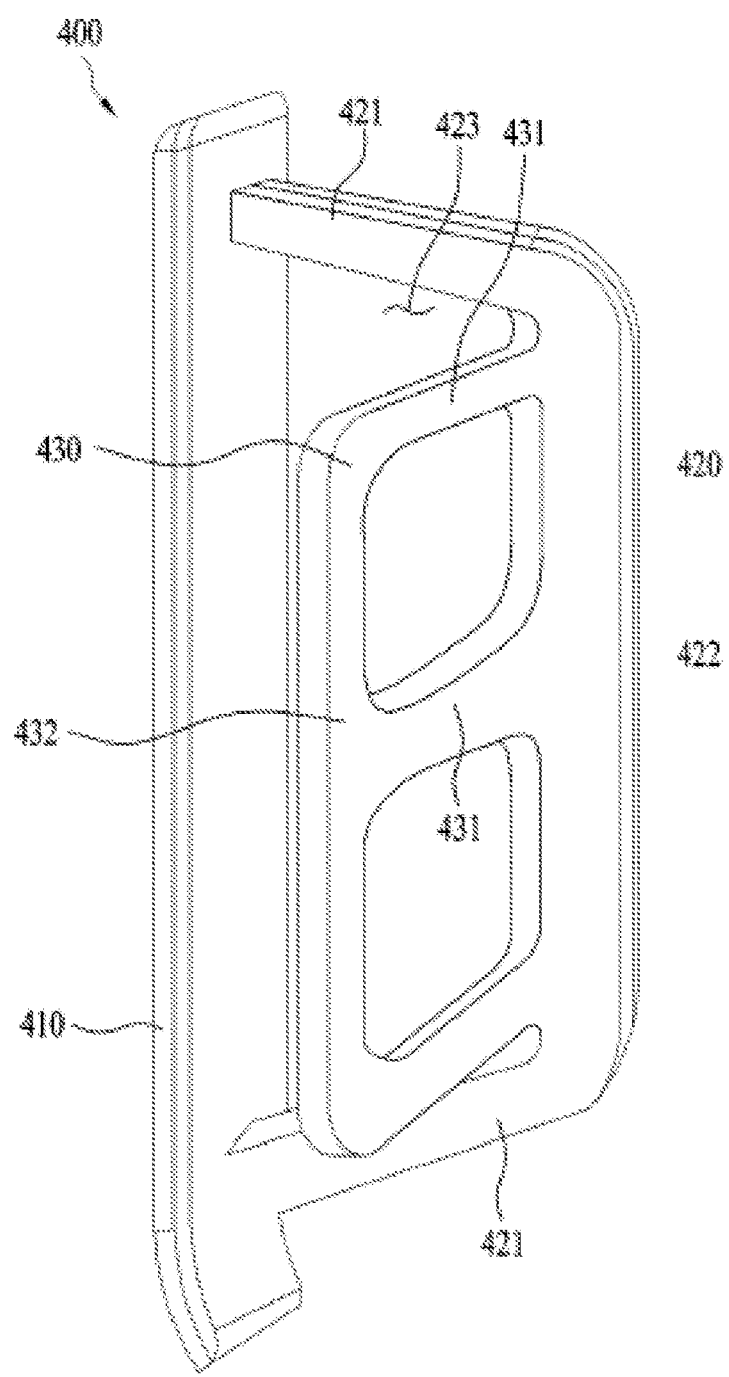
FIG. 6 is a diagram illustrating a second embodiment of a hook unit in the present disclosure.
Figure 7:
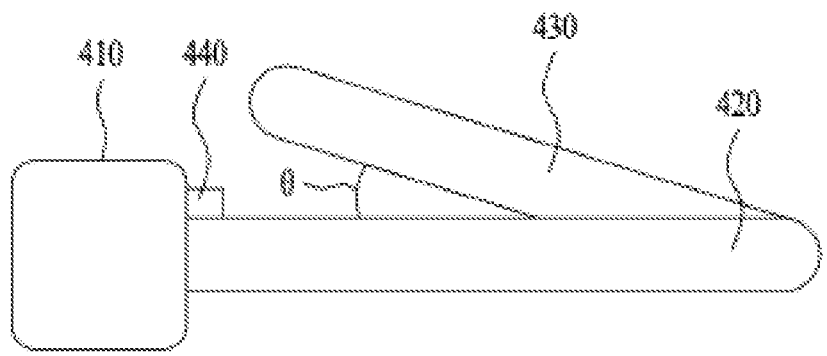
FIG. 7 is a diagram illustrating the second embodiment of the hook unit, viewed from a side.

FIGS. 6 and 7 illustrate a second embodiment of the present disclosure that the hook unit 430 is provided at a preset angle with respect to the insert unit 420.

As shown in FIGS. 6 and 7, the hook unit 430 may be extended from the insert unit 420 to form a preset angle.

When the insert assembly 400 is inserted in the gap region 110, the hook unit 430 may contact with an inner circumferential surface of the gap region 110 and be pressed. Accordingly, the hook unit 430 may get closer to the insert unit 420 or inserted in the gap region 110 in a state of being attached to the insert unit 420.

After that, the inserting of the insert unit 420 into the gap region 110 is complete and the hook unit 420 is restituted by the elasticity, to be spaced apart again from the insert unit 420 and contact with the internal wall of the panel 100.

Like the first embodiment, the hook unit 430 may be attached to the internal wall of the panel 110 and support the insert assembly 400 not to separate from the panel 100.

In the second embodiment, the hook unit 430 may rotate or bend a predetermined angle in the panel 100 even when the body unit 410 is introduced in the gap region 110 along a vertical direction with respect to the ground.

Specifically, even if the hook unit 430 is not bent by its own weight, the hook unit 430 may be rotated or bent toward the internal wall of the panel 100 by the elasticity.

Only when the insert assembly 400 is inserted in the gap region 110, the insert assembly 400 may effectively support the insert assembly 400 not to separate from the panel 100.

Figure 8:
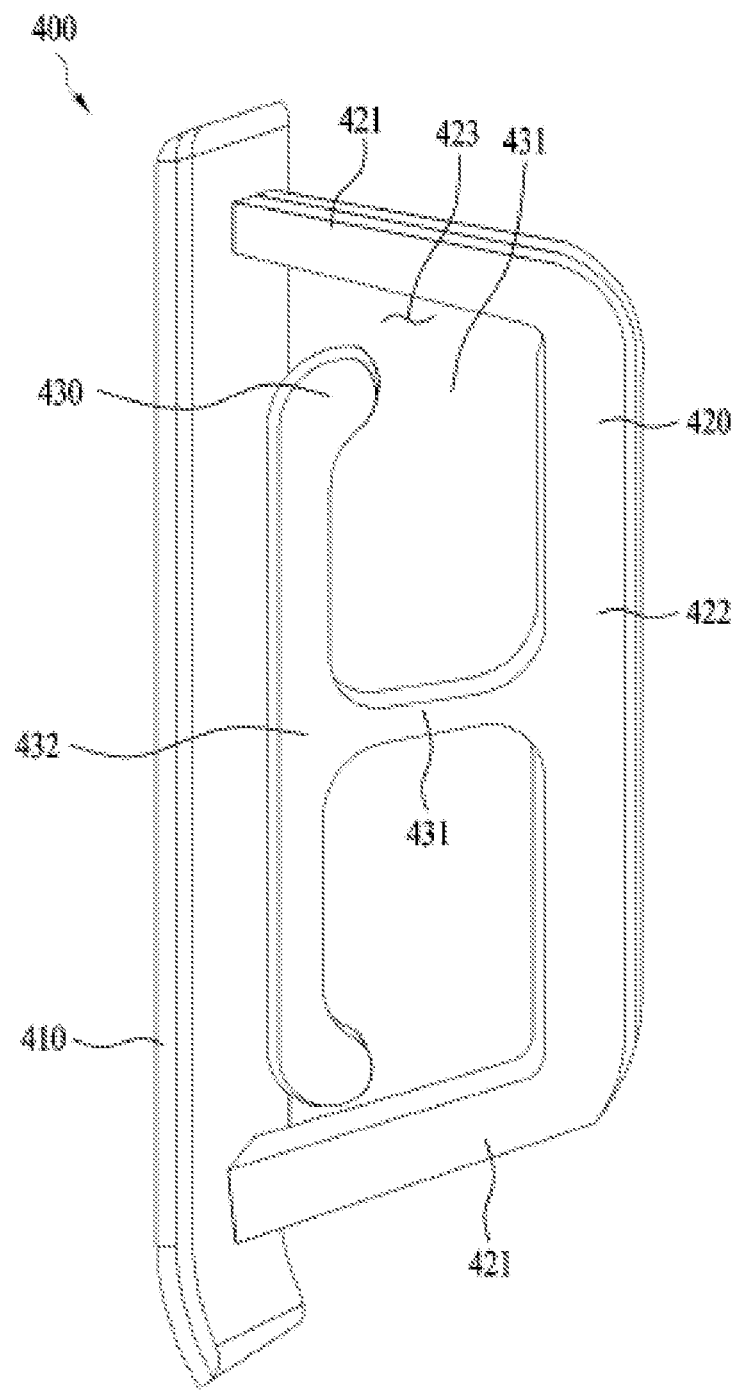
FIG. 8 is a diagram illustrating a first profile of the hook unit.

Referring to FIGS. 7 and 8, the profile of the hook unit will be described.

The hook unit 430 may include a connection rib 431 projected from the insert unit 420 toward the body unit 410 and a support rib 432 provided in one end of the connection rib 431 and able to contact with an internal wall of the panel 100.

Figure 9:
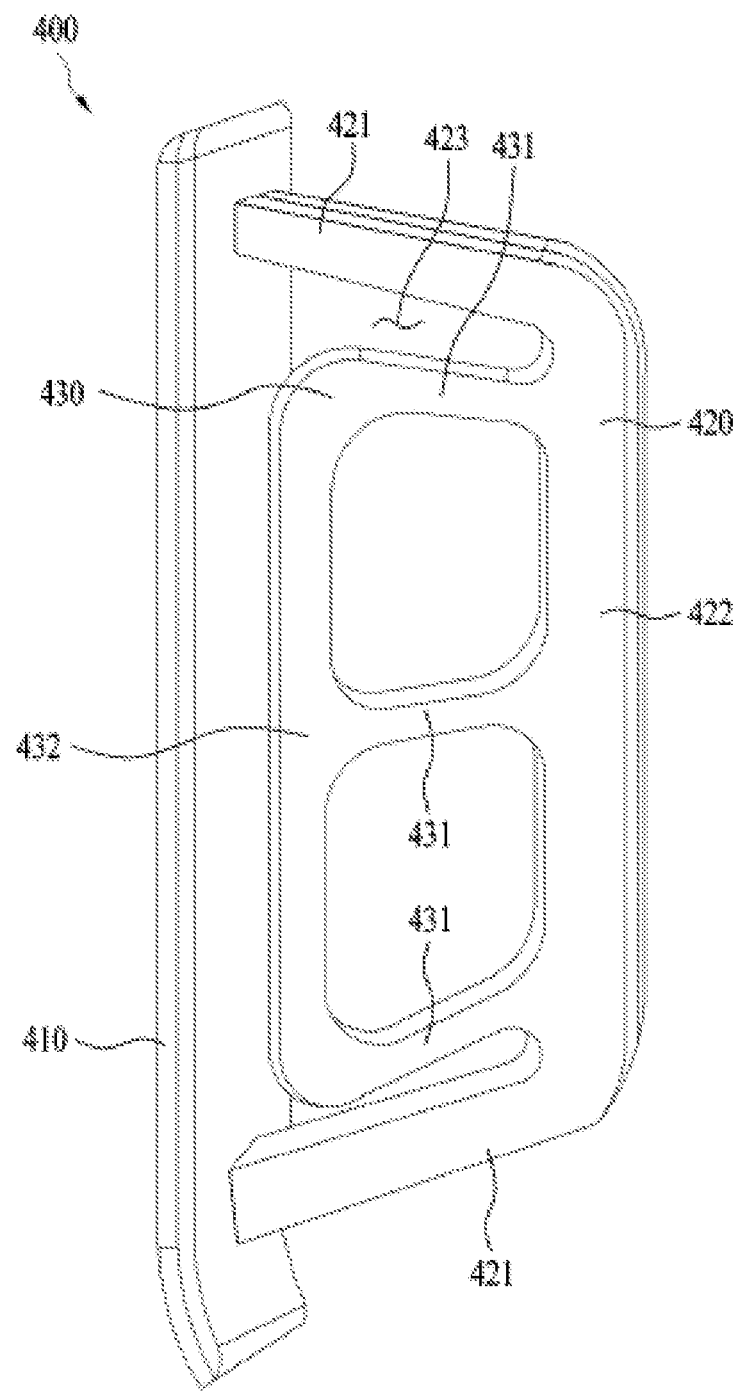
FIG. 9 is a diagram illustrating a second profile of the hook unit.

A single connection rib 431 may be provided (see FIG. 8) or a plurality of connection ribs 431 may be spaced apart a preset distance from each other along a longitudinal direction of the insert unit 430 (see FIG. 9).

In case the plurality of the connection ribs 431 are provided, the support rib 432 may be connected to all of the connection ribs 431.

Although not shown in the drawings, the hook unit 430 may be provided in a plate shape. However, the hook unit 430 including the connection ribs 431 and the support rib 432 may have the smaller rotation number than the hook unit 430 formed in the plate shape.

Accordingly, the hook unit 430 including the connection rib 431 and the support rib 432 could bend or rotate with respect to the insert unit 420 more smoothly.

In case of the hook unit 430 formed of the plate shape, one or more penetrating holes may be provided in one surface of the hook unit 430. The holes may have an effect of lowering the rotation moment of the hook unit 430.

The hook unit 430 having the one or more holes or including the connection rib 421 and the support rib 422 may have another effect of reducing the cost of materials.

Figure 10:
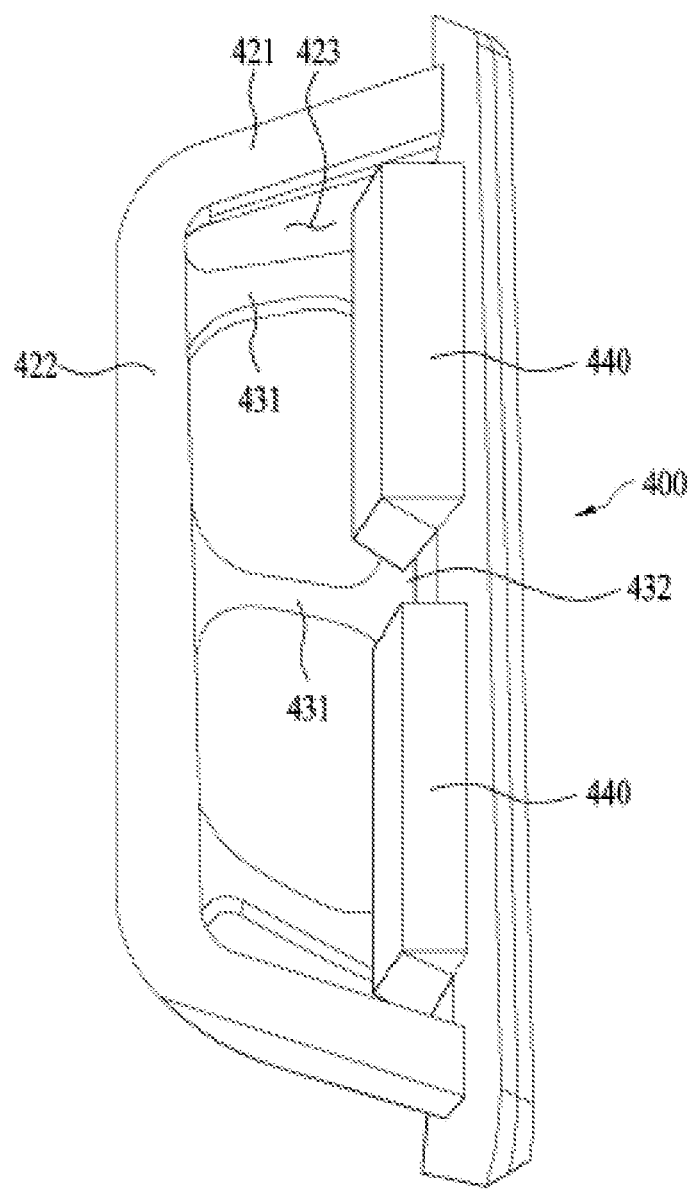
FIG. 10 is a diagram illustrating a profile of a restriction unit in the present disclosure.

FIG. 10 illustrates a restriction unit 440 provided in the insert assembly 400.

Referring to FIG. 10, the insert assembly 400 may include the restriction unit 440 projected from the body unit 410 toward the hook unit accommodating hole 423 and contacting with one surface of the support rib 432.

In this instance, the restriction unit 440 may be projected in a direction vertical to the plane where the insert unit 420 is provided.

The hook unit 430 is inserted in the gap region 110 and then pressed by an inner circumferential surface of the gap region 110 to closely contact with the insert unit 420. At this time, the restriction unit 440 pushes one end of the hook unit 430. Specifically, once the insert assembly 400 is inserted in the gap region 110, the hook unit 430 may be spaced apart a preset distance from the insert unit 420 by the pushing force of the restriction unit 440.

As an alternative example, the restriction unit 440 may restrict the support rib 432 to rotate or bend in a desired direction. In other words, the restriction unit 440 restricts the rotation of the hook unit 430 for the hook unit 430 to get spaced apart a preset angle from the insert unit 420 only in the desired direction.

After the insert assembly 400 is inserted in the gap region 100, the restriction unit 440 may prevent the hook unit 430 from being rotated or bent by the elasticity or external shock toward the insert unit 420 again.

Accordingly, the insert assembly 400 may be prevented from separating from the panel.

A plurality of restriction units 440 may be provided in the body unit 410.

All components of the insert assembly in accordance with the present disclosure may be integrally formed with each other. In other words, the body unit 410, the insert unit 420 and the hook unit 430 may be integrally formed with each other as one body.

When the insert assembly 400 integrally formed as one body is inserted in the gap region 110, the insert assembly 400 is fixed by the hook unit 430 and the gap region 110 of the panel 100 may be finished simply.

Moreover, the body unit 410, the insert unit 420 and the hook unit 430 may be manufactured through one manufacture process and the assembly process may get simple. In addition, the assembly process of insert assembly 400 may be omitted. As a result, the overall production time and cost may be lowered.

The insert assembly 400 may be inserted in the gap region 110 of the panel and seal and finish the gap region 110. Accordingly, a sharp surface of the gap region 110 will not be exposed outside and safety can be enhanced.

The gap region 110 is not exposed outside by the insert assembly 400. Accordingly, the external design may be enhanced.

The insert assembly 400 may prevent moisture or foreign substances from coming through the gap region 110. Accordingly, the insert assembly 400 may prevent the panel 100 from getting corroded or home electric appliances including such the panel 100 from getting damaged.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. An assembly comprising:
a gap region formed in a corner by bending a first side and a second side of a single panel,
wherein the second side is adjacent the first side; and
an insert assembly to fill the gap region comprising:
a body unit covering the gap region not to be exposed to the outside;
an insert unit extended from the body unit and inserted in the gap region; and
a hook unit extended a preset distance from the insert unit toward the body unit, the hook unit comprising one end connected to the insert unit and the other end provided as a free end,
wherein the body unit, the insert unit, and the hook unit are integrally formed with each other as one body, and
wherein the body unit has a predetermine shape corresponding to the gap region to form flat surfaces between the body unit and each side of the panel when the insert assembly fills the gap region.

2. The assembly of claim 1, wherein the hook unit of the insert assembly is formed of a material having elasticity.

3. The assembly of claim 1, wherein the hook unit of the insert assembly is able to rotate on the insert unit within a range of preset angles.

4. The assembly of claim 1, wherein the insert unit of the insert assembly comprises a hook unit accommodating hole which is able to accommodate the hook unit while the insert unit is inserted in the gap region.

5. The assembly of claim 4, wherein the hook unit of the insert assembly further comprises:
a connection rib projected from the insert unit toward the body unit; and
a support rib provided in one end of the connection rib and able to contact with an internal wall of the panel.

6. The assembly of claim 5, wherein a plurality of connection ribs are spaced apart a preset distance from each other and the support rib is connected to all of the connection ribs.

7. The assembly of claim 5, wherein the insert assembly further comprises:
a restriction unit projected from the body unit toward the hook unit accommodating hole and restricting the rotation of the support rib by contacting with one surface of the support rib.

8. The assembly of claim 7, wherein the restriction unit is projected in the direction which is equal to the direction in which the hook unit is spaced apart from the insert unit.

9. The assembly of claim 1, wherein the insert unit of the insert assembly further comprises:
an extension rib connected with each end of the body unit; and
an insert rib extended from one end of the extension rib and in parallel with the body unit.

10. The assembly of claim 9, wherein the insert rib is shorter than the body unit.

11. The assembly of claim 9, wherein a cross section of the insert rib is wedge-shaped.

12. The assembly of claim 1, wherein the hook unit of the insert assembly comprises one or more holes provided therein.

* * * * *